(12) United States Patent
Krishnamoorthy et al.

(10) Patent No.: US 10,462,724 B2
(45) Date of Patent: Oct. 29, 2019

(54) METHOD AND APPARATUS FOR MINIMIZING/AVOIDING CONFLICTS BETWEEN DIFFERENT RADIO ACCESS TECHNOLOGIES SERVING USER EQUIPMENT

(71) Applicant: QUALCOMM Incorporated, San Diego, CA (US)

(72) Inventors: Parthasarathy Krishnamoorthy, Hyderabad (IN); Srinivasan Balasubramanian, San Diego, CA (US); Kuo-Chun Lee, San Diego, CA (US); Anand Rajurkar, Hyderabad (IN); Suresh Sanka, Hyderabad (IN); Prashanth Haridas Mohan, Hyderabad (IN); Aravinth Rajendran, Hyderabad (IN); Janga Reddy Alimineti, Hyderabad (IN); Krishnakumar Vasanthasenan, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 14/734,257

(22) Filed: Jun. 9, 2015

(65) Prior Publication Data
US 2016/0366626 A1 Dec. 15, 2016

(51) Int. Cl.
*H04W 36/20* (2009.01)
*H04W 88/06* (2009.01)
(Continued)

(52) U.S. Cl.
CPC ........... *H04W 36/20* (2013.01); *H04W 24/08* (2013.01); *H04W 36/00837* (2018.08); *H04W 48/20* (2013.01); *H04W 88/06* (2013.01)

(58) Field of Classification Search
None
See application file for complete search history.

(56) References Cited

U.S. PATENT DOCUMENTS

| 8,805,284 B2 | 8/2014 | Nejatian et al. |
| 2013/0242919 A1 | 9/2013 | Koo et al. |

(Continued)

OTHER PUBLICATIONS

International Search Report and Written Opinion—PCT/US2016/033463—ISA/EPO—dated Aug. 9, 2016.

(Continued)

*Primary Examiner* — Yemane Mesfin
*Assistant Examiner* — Jeff Banthrongsack
(74) *Attorney, Agent, or Firm* — Norton Rose Fulbright US LLP

(57) ABSTRACT

Minimizing conflicts between different radio access technologies (RATs) is disclosed herein which include monitoring, by a user equipment (UE), a first use of a UE Radio Frequency (RF) resource by a first Radio Access Technology (RAT). The UE monitors a second use of the UE resource by a second RAT. The UE is served by a current serving cell in the second RAT. The UE may also determine a percentage of conflict between a first use of a UE resource by a first RAT and the second use of the UE resource by the second RAT over a predefined period of time, and initiating, by the UE, a cell reselection attempt to one or more neighboring cells of a plurality of neighboring cells serving the second RAT based on the determined percentage of conflict exceeding a predetermined threshold.

28 Claims, 7 Drawing Sheets

(51) Int. Cl.
H04W 48/20 (2009.01)
H04W 36/00 (2009.01)
H04W 24/08 (2009.01)

(56) References Cited

U.S. PATENT DOCUMENTS

| | | | |
|---|---|---|---|
| 2013/0250784 A1* | 9/2013 | Mandapu | H04W 36/30 370/252 |
| 2013/0324112 A1 | 12/2013 | Jechoux et al. | |
| 2014/0023032 A1* | 1/2014 | Kim | H04W 74/0833 370/329 |
| 2014/0071939 A1* | 3/2014 | Yang | H04W 36/00 370/331 |
| 2014/0073366 A1 | 3/2014 | Xing et al. | |
| 2014/0119343 A1* | 5/2014 | Chin | H04W 68/12 370/335 |
| 2014/0141824 A1* | 5/2014 | Kim | H04W 16/14 455/501 |
| 2014/0242982 A1 | 8/2014 | Yang et al. | |
| 2014/0349646 A1 | 11/2014 | Su et al. | |

OTHER PUBLICATIONS

LG Electronics Inc., New measurement for detecting IDC interference, 3GPP TSG-RAN WG2 Meeting #76 R2-116320, [online], XP050564535, Nov. 8, 2011, p. 1-p. 3, URL,http://www.3gpp.org/ftp/tsg_ran/WG2_RL2/TSGR2_76/Docs/R2-116320.zip.

* cited by examiner

METHOD AND APPARATUS FOR MINIMIZING/AVOIDING CONFLICTS BETWEEN DIFFERENT RADIO ACCESS TECHNOLOGIES SERVING USER EQUIPMENT

BACKGROUND

Field

Aspects of the present disclosure relate generally to wireless communication systems, and more particularly, to minimizing and/or avoiding conflicts between different radio access technologies (RATs) serving a user equipment (UE).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

Furthermore, the use of more than one network or radio access technology (RAT) for wireless communications is becoming more prevalent and devices with the capability of accessing multiple RATs are widely available. The capability of devices to access multiple RATs creates a contention for resources which results in conflicts between the different RATs. Efficient management of multiple RATs access to minimize or avoid conflicts between the different RATs remains an important aspect for enhancing the user experience with mobile communications and efficient network operation.

SUMMARY

In one aspect of the disclosure, a method of wireless communication includes monitoring, by a UE, a first use of a UE resource by a first RAT, monitoring, by the UE, a second use of the UE resource by a second RAT, wherein the UE is served by a current serving cell in the second RAT, determining, by the UE, a percentage of conflict between the first use of the UE resource by the first RAT and the second use of the UE resource by the second RAT over a predefined period of time, and initiating, by the UE, a cell reselection attempt to one or more neighboring cells of a plurality of neighboring cells serving the second RAT based on the determined percentage of conflict exceeding a predetermined threshold.

In an additional aspect of the disclosure, an apparatus configured for wireless communication includes means for monitoring, by a UE, a first use of a UE resource by a first RAT, means for monitoring, by the UE, a second use of the UE resource by a second RAT, wherein the UE is served by a current serving cell in the second RAT, means for determining, by the UE, a percentage of conflict between the first use of the UE resource by the first RAT and the second use of the UE resource by the second RAT over a predefined period of time, and means for initiating, by the UE, a cell reselection attempt to one or more neighboring cells of a plurality of neighboring cells serving the second RAT based on the determined percentage of conflict exceeding a predetermined threshold In an additional aspect of the disclosure, a non-transitory computer-readable medium having program code recorded thereon includes program code for causing a computer to monitor, by a UE, a first use of a UE resource by a first RAT, program code for causing the computer to monitor, by the UE, a second use of the UE resource by a second RAT, wherein the UE is served by a current serving cell in the second RAT, program code for causing the computer to determine, by the UE, a percentage of conflict between the first use of the UE resource by the first RAT and the second use of the UE resource by the second RAT over a predefined period of time, and program code for causing the computer to initiate, by the UE, a cell reselection attempt to one or more neighboring cells of a plurality of neighboring cells serving the second RAT based on the determined percentage of conflict exceeding a predetermined threshold.

In an additional aspect of the disclosure, an apparatus configured for wireless communication includes at least one processor and a memory coupled to the processor. The processor is configured to monitor, by a UE, a first use of a UE resource by a first RAT, monitor, by the UE, a second use of the UE resource by a second RAT, wherein the UE is served by a current serving cell in the second RAT, determine, by the UE, a percentage of conflict between the first use of the UE resource by the first RAT and the second use of the UE resource by the second RAT over a predefined period of time, and, initiate, by the UE, a cell reselection attempt to one or more neighboring cells of a plurality of neighboring cells serving the second RAT based on the determined percentage of conflict exceeding a predetermined threshold.

The foregoing has outlined rather broadly the features and technical advantages of the present application in order that the detailed description that follows may be better understood. Additional features and advantages will be described hereinafter which form the subject of the claims. It should be appreciated by those skilled in the art that the conception and specific aspect disclosed may be readily utilized as a basis for modifying or designing other structures for carrying out the same purposes of the present application. It should also be realized by those skilled in the art that such equivalent constructions do not depart from the spirit and scope of the present application and the appended claims. The novel features which are believed to be characteristic of aspects, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present claims.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
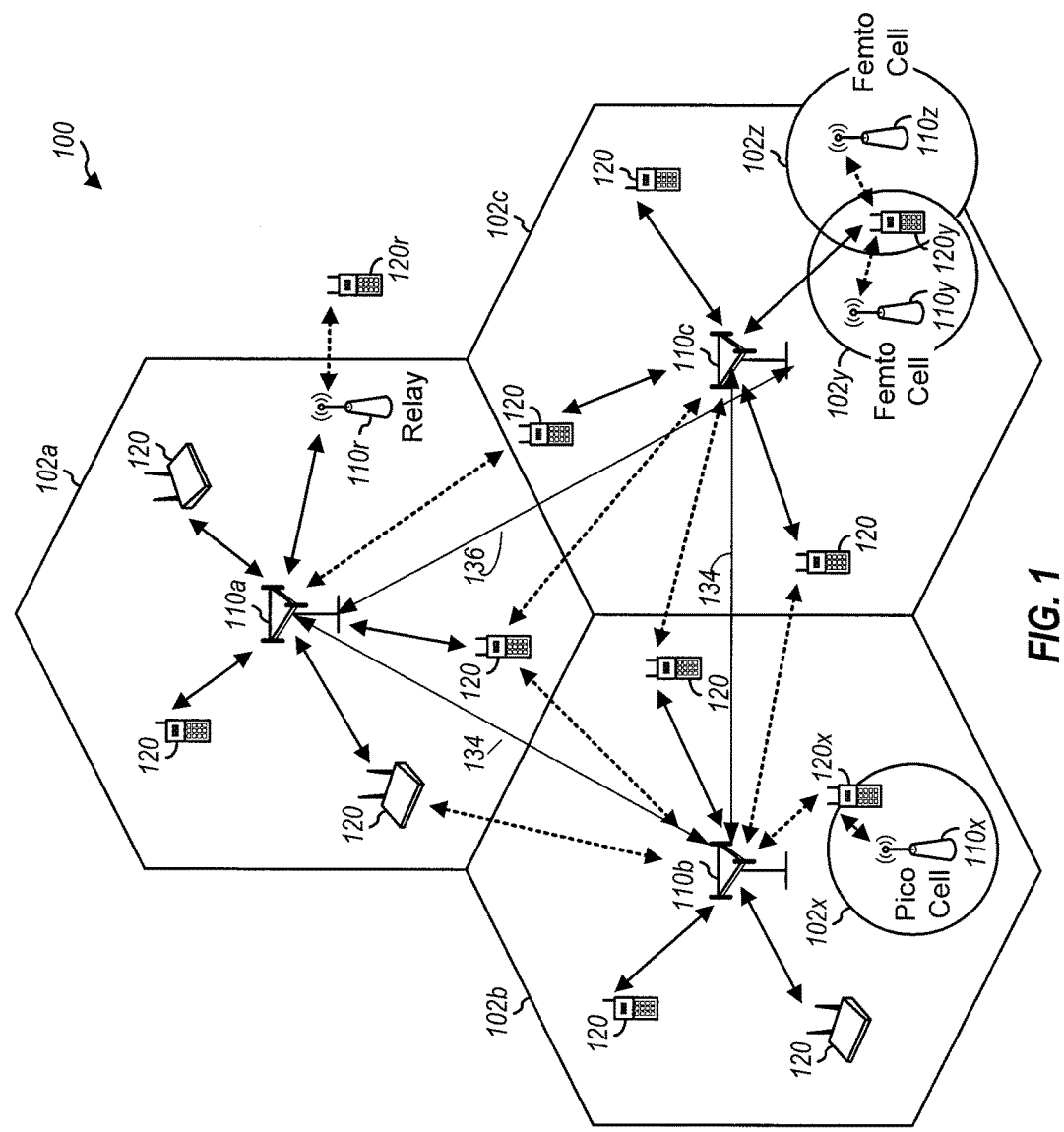
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a smart phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

The wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay station 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management.

The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as cell range extension (CRE).

The wireless network 100 achieves CRE by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with cell range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120y may be close to the femto eNB 110y and may have high received power for the eNB 110y. However, the UE 120y may not be able to access the femto eNB 110y due to restricted association and may then connect to the macro eNB 110c (as shown in FIG. 1) or to the femto eNB 110z also with lower received power (not shown in FIG. 1). The UE 120y may then observe high interference from the femto eNB 110y on the downlink and may also cause high interference to the eNB 110y on the uplink. Using coordinated interference management, the eNB 110c and the femto eNB 110y may communicate over the backhaul 134 to negotiate resources. In the negotiation, the femto eNB 110y agrees to cease transmission on one of its channel resources, such that the UE 120y will not experience as much interference from the femto eNB 110y as it communicates with the eNB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNBs. The eNBs in a synchronous system are presumptively synchronized across the system. However, for example, considering a UE that is a distance of 5 km from the macro eNB, the propagation delay of any downlink signals received from that macro eNB would be delayed approximately 16.67 µs (5 km÷3×$10^8$, i.e., the speed of light, 'c'). Comparing that downlink signal from the macro eNB to the downlink signal from a much closer femto eNB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Figure 2:
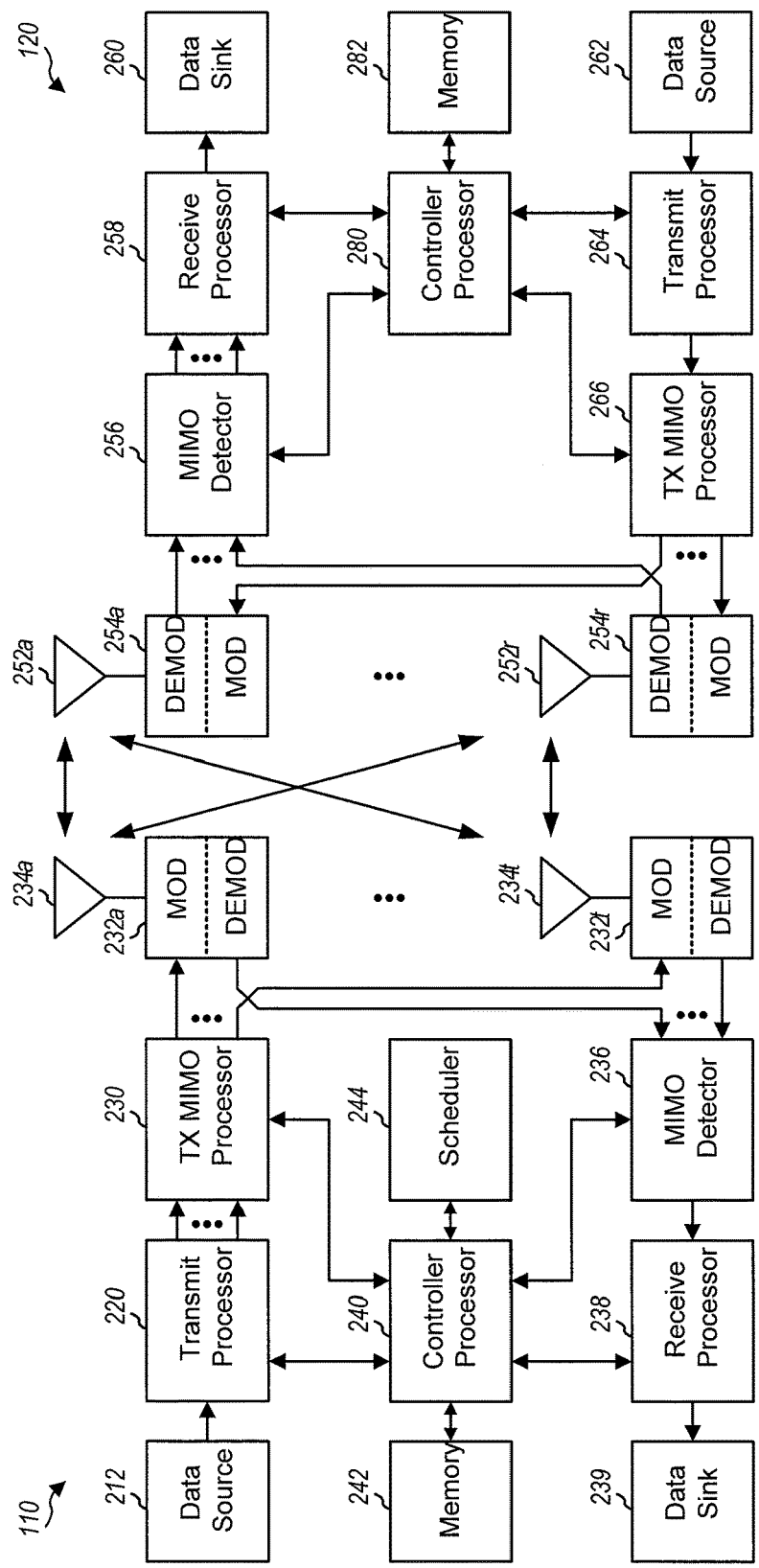
FIG. 2 is a block diagram conceptually illustrating a design of a base station/eNB and a UE configured according to one aspect of the present disclosure.

FIG. 2 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 234a through 234t, and the UE 120 may be equipped with antennas 252a through 252r.

At the eNB 110, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the eNB 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the demodulators 254a through 254r (e.g., for SC-FDM, etc.), and transmitted to the eNB 110. At the eNB 110, the uplink signals from the UE 120 may be received by the antennas 234, processed by the modulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

The controllers/processors 240 and 280 may direct the operation at the eNB 110 and the UE 120, respectively. The controller/processor 240 and/or other processors and modules at the eNB 110 may perform or direct the execution of various processes for the techniques described herein. The controllers/processor 280 and/or other processors and modules at the UE 120 may also perform or direct the execution of the functional blocks illustrated in FIGS. 5, 7 and 8, and/or other processes for the techniques described herein. The memories 242 and 282 may store data and program codes for the eNB 110 and the UE 120, respectively. A scheduler 244 may schedule UEs for data transmission on the downlink and/or uplink.

Various multiple radio access technologies (RATs) are deployed by service providers as advances in technologies occur. Because of time and cost considerations, an entire wireless system may not be immediately replaced or upgraded to the next generation RAT. As such, it is common to find multiple RATs deployed throughout any given geographic region. Mobile operators may take advantage of the mixed RAT deployments by providing for certain services to be handled by one RAT while other services are handled by another coexisting RAT. For example, LTE may have better performance with packet switched communications while GSM is available for circuit switched communications.

Mobile operators and mobile device manufacturers may take advantage of this environment by providing multi-RAT operation and devices. For example, some multiple subscriber identity module (multi-SIM) devices, such as simultaneous GSM voice and LTE data (SGLTE) or simultaneous GSM voice and time division synchronous code division multiple access (TD-SCDMA) data (SGTDS) devices, have a dedicated radio for GSM and another dedicated radio for the other RAT (e.g., LTE, TD-SCDMA, etc.).

In other examples of multi-SIM devices, resources may be shared by different RATs. For example, single-radio multi-SIM devices may have a single radio capable of transmitting and receiving wireless radio frequency signals from different RATs. Thus, a single-radio multi-SIM device can be associated, registered, or connected simultaneously with both a GSM network and an LTE network, and can be configured to establish connections with either the GSM network or the LTE network. Because the RF resources of the device are shared by different RATs, an RF resource contention may occur when the RF resources used by the device for activities associated with the first RAT (which may also be referred to herein as RAT1) conflict with the RF resources used by the device for activities associated with the second RAT (which may also be referred to herein as RAT2), both of which compete for the RF resource(s).

For example, a device may have a single RF radio which is used to implement one or more services in a first RAT, e.g., evolved Multimedia Broadcast Multicast Services (eMBMS), Voice over LTE (VoLTE), or data file downloads in an LTE RAT. However, when implementing these LTE services, the device may need to tuneaway the radio to a second RAT, e.g., a GSM RAT, to perform various activities associated with the GSM RAT, e.g., GSM page monitoring, neighboring cell synchronization, or system information acquisitions, etc. During this tuneaway period of the radio from the LTE RAT to the GSM RAT, LTE RAT activities may be suspended. Typically, since GSM RAT carries voice communication, GSM RAT activity may be prioritized over LTE RAT activities. Therefore, when there is a conflict between the use of the radio to perform GSM RAT activities and LTE RAT activities, use of the radio for GSM RAT activities may be given higher priority than use of the radio for LTE RAT activities. Therefore, when the use of the radio for LTE RAT activities conflicts with the use of the radio for GSM activities, the use of the radio for LTE RAT activities may be interrupted in favor of the use of the radio for GSM RAT activities. This interruption in the use of the radio for LTE RAT may cause performance degradation of the LTE RAT activities.

Figure 3:
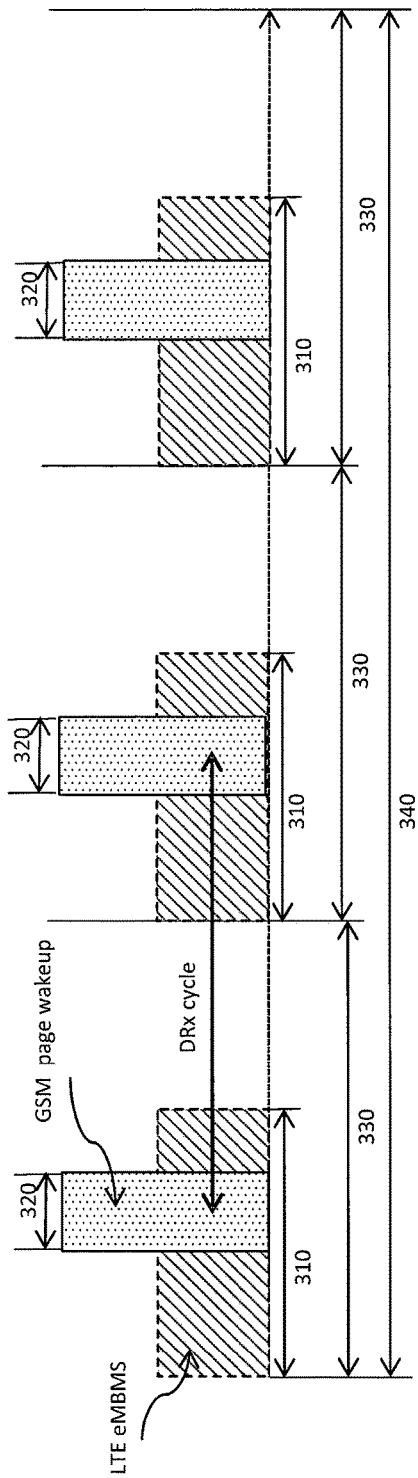
FIG. 3 is an illustrative diagram of a conflict between the between the use of a UE RF resource by a first RAT and the use of the UE RF resource by a second RAT.

FIG. 3 is a block diagram that illustrates an example of a conflict that can occur when a radio is shared by GSM and LTE for GSM page wakeup and LTE eMBMS. In this example, a single-radio device is being used for eMBMS, an LTE RAT operation. During a period of time 310, the single radio is used to process eMBMS data. However, during period of time 310, the device is also scheduled to perform a GSM page wakeup, a GSM RAT operation, for period of time 320, which overlaps with period of time 310. GSM page wakeup requires tuneaway of the single radio from the LTE RAT to the GSM RAT, which creates a conflict between the use of the single radio for LTE RAT eMBMS and the use of the radio for GSM RAT for GSM page wakeup during period 320. Since GSM operations may be given priority over LTE operations, the radio performs a tuneaway from the LTE RAT to the GSM RAT during period 320. As a result, the eMBMS data is lost during the period of conflict 320. Moreover, in this example, the device is operating in the GSM RAT using discontinuous reception (DRx), and thus, the GSM page wakeups are performed only during scheduled periods. Using GSM DRx reduces power consumption, which extends battery life, but it also increases the likelihood that a conflict will occur between LTE services and GSM activities because the GSM page wakeups are periodic/cyclic in nature. Typically, DRx cycles used in GSM network deployments are relatively short, e.g., 470 ms. As a results, there is a high likelihood that GSM page wakeups will conflict with LTE RAT activities.

Figure 4:
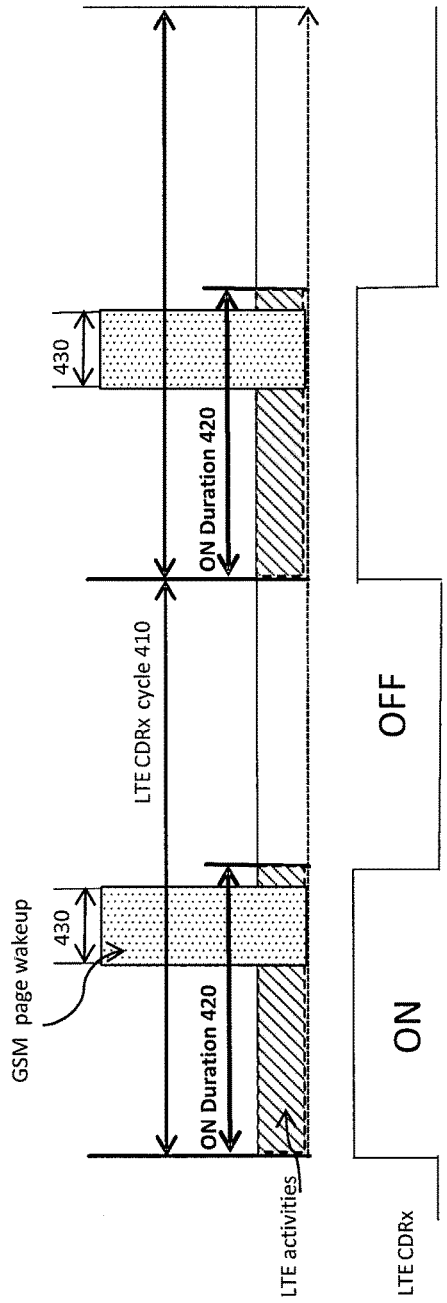
FIG. 4 is an illustrative diagram of a conflict between the between the use of a UE RF resource by a first RAT and the use of the UE RF resource by a second RAT.

FIG. 4 is a block diagram that illustrates another example of a conflict when resources of a multi-SIM device are shared by a first RAT and a second RAT. In this example, the device is operating in an LTE RAT in a connected mode DRX (CDRx), which is a power-savings feature facilitated by the LTE RAT. As illustrated in FIG. 4, the device is allocated an ON duration 420, within CDRx cycle 410, during which the device may perform LTE RAT activities, such as monitoring downlink transmissions, e.g., PDCCH. Outside of LTE ON duration 420, the device may turn the radio off for reduced power consumption. However, during LTE ON duration 420, the device is also scheduled to perform a GSM page wakeup, a GSM RAT operation, for period of time 430, which overlaps with LTE ON duration 420. As explained above, a GSM page wakeup triggers a tuneaway of the single-radio from the LTE RAT to the GSM RAT. Thus, in this example, the radio may tuneaway from the LTE RAT to the GSM RAT during period of time 430. As a result, the LTE CDRx is interrupted during the conflict of period of time 430.

Accordingly, various aspects of the present disclosure are directed to reducing or eliminating conflicts between the shared use of a resource by a first RAT and a second RAT. It is noted that although the disclosure discusses aspects in the context of reducing conflicts between the shared used of RF resources by a first RAT and a second RAT, a conflict between the shared resources of a device by a first RAT and a second RAT, other than RF resources is also envisioned. For example, the shared resources may include a baseband resource.

Figure 5:
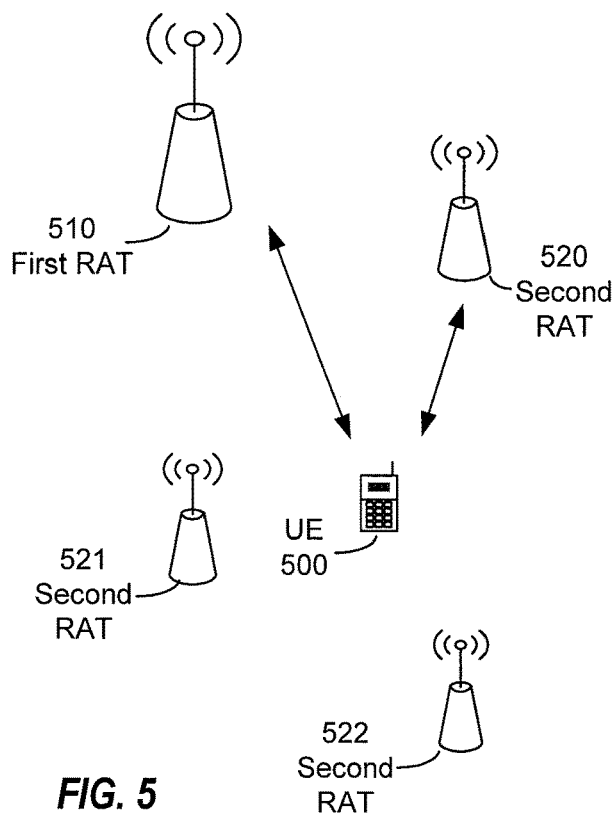
FIG. 5 is a block diagram illustrating a system configured according to one aspect of the present disclosure.
Figure 6:
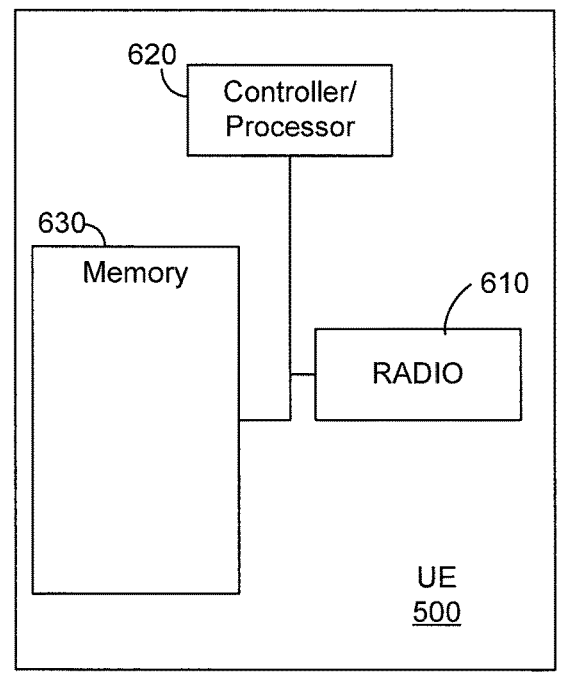
FIG. 6 is a block diagram illustrating a UE configured according to one aspect of the present disclosure.

FIG. 5 is a block diagram illustrating a single radio UE 500 configured for multi-RAT operation in accordance with aspects of the present disclosure. The example illustrated in FIG. 5 will be described with respect to the hardware and components illustrated in FIG. 6. FIG. 6 is a block diagram illustrating UE 500. UE 500 may include a processor 620, a memory 630, and a radio 610. The memory 630 may store instructions that, when executed by the processor 620, cause the processor 620 to perform operations described herein with reference to FIGS. 3-8. In one aspect, the UE 500 may be the UE 120 of FIG. 1 (e.g., the UE 120x or the UE 120y of FIG. 1) or may be the UE 120 described with reference to FIG. 2. In some aspects, radio 610 may include various components and hardware for conducting wireless communication (e.g., one or more transmitters and receivers, one or more transceivers, and may include one or more antennas or antenna arrays). For example, radio 610 may include antennas 552a through 552r described with reference to FIG. 2 and other circuitry (e.g., the demodulators/modulators 554a through 554r of FIG. 2, the MIMO detector 556, the receive processor 558, the transmit MIMO processor 566 of FIG. 2, the transmit processor 564 of FIG. 2, etc.). In one aspect, the processor 620 may be the controller/processor 580 of FIG. 2 and the memory 630 may be the memory 582 of FIG. 2.

In the example aspect illustrated in FIG. 5, UE 500 is shown as being served by a first RAT (or RAT1) cell 510 and also served by a second RAT (or RAT2) cell 520, which may allow UE 500 to perform activities in either the RAT1 or the RAT2. It is to be understood that UE 500 may be configured such that performing activities in the RAT1 uses the single-radio tuned to the RAT1 (e.g., via RAT1 serving cell 510), and performing activities in the RAT2 uses the single-radio tuned to the RAT2 (e.g., via RAT2 serving cell 520). Moreover, in this example, neighboring RAT2 cells 521 and 522 operate within the RAT2, but are not currently serving UE 500.

During operation, UE 500 may monitor RAT1 activities. The monitoring may include monitoring a use of radio 610 for RAT1 activities. For example, the UE may determine a period of time that radio 610 is tuned to RAT1, e.g., tuned to the serving frequency of the RAT1 serving cell 510. In some examples, UE 500 may determine whether UE 500 is being used for RAT1 services such as eMBMS, VoLTE, or Data File downloads, in the case of RAT1 being LTE, and may monitor the use of RF resources for those services. Additionally or alternatively, UE 500 may determine whether LTE CDRx is being used and may determine a CDRx cycle, including the ON duration of the CDRx cycle. The monitoring functionality of UE 500 may be controlled by processor 620.

UE 500 may also monitor activities using RAT2. The monitoring may include monitoring a use of radio 610 for activities associated with RAT2. For example, the UE may determine a period of time that radio 610 is tuned to RAT2, e.g., tuned to the serving frequency of the RAT2 serving cell 520. In such instances, UE 500 may determine whether GSM DRx is being used and may monitor periods of GSM page wakeups.

UE 500's functionality to monitor the use of radio 610 with the first RAT and with the second RAT may allow UE 500 to determine when there is a conflict with a resource shared by the first RAT and the second RAT. Thus, UE 500 may determine a percentage of conflict when radio 610 is shared by the first RAT and the second RAT over a pre-defined period of time. For example, with reference to FIG. 3, UE 500 may determine that over predefined period of time 330, radio 610 is used by the LTE RAT for period of time 310 for eMBMS, and by the GSM RAT for period of time 320 to perform GSM page wakeup. UE 500 may determine that periods of time 310 and 320 overlap, and thus, there is a conflict when radio 610 is shared by the LTE RAT and the GSM RAT during predefined period of time 330, since radio 610 would have to tuneaway from the LTE RAT to the GSM RAT. UE 500 may determine the period of conflict as period of time 320, since period of time 320 occurs entirely within period of time 310. It should be understood that the period of GSM page wakeup may not overlap entirely with the LTE RAT activity, but may only overlap for a portion of the GSM page wakeup period. UE 500 may also calculate the percentage of predefined period of time 330 when there is a conflict between the first RAT and the second RAT by determining the percentage of predefined period of time 330 that period of conflict 320 represents. For example, the percentage of conflict may be calculated according to Equation 1 below, with period of time 320 as the period of conflict and period of time 330 as the predefined period of time. The calculated percentage of conflict may be stored in memory 630.

$$\text{Conflict (\%)} = (\text{period of conflict/predefined period of time}) * 100 \quad (1)$$

In additional aspects, UE 500 may also measure several conflict percentages over a predefined period of time. For example, UE 500 may determine a conflict percentage for each period of time 330 within predefined period of time 340. As explained above, the conflict percentage indicates a percentage of time when the use of radio 610 by the first RAT conflicts with the use of radio 610 by the second RAT. UE 500 may calculate an average of the measured conflict percentages of each period of time 330 over predefined period of time 340. The calculated average may be stored in memory 630.

UE 500 may compare the determined percentage of conflict over the predefined period of time with a predetermined threshold. If it is determined that the determined percentage of conflict between the use of radio 610 by the first RAT and the use of radio 610 by the second RAT exceeds the predetermined threshold, UE 500 may initiate a cell reselection attempt from second RAT serving cell 520 to one of neighboring cells 521 and 522. Since GSM DRx cycles, and thus GSM page wakeups, vary in different cells, GSM cell reselection may result in a reduction or avoidance of a conflict between the use of the radio by the GSM RAT and the LTE RAT.

In some aspects of the present disclosure, the cell reselection attempt may be further based on a receive power of the neighboring RAT2 cells. Thus, cell reselection would only be initiated to a neighboring RAT2 cell if the receive power of the neighboring RAT2 cell exceeds a receive power threshold. For example, referring to FIGS. 5 and 6, based on a determination that a conflict percentage between the use of radio 610 by first RAT serving cell 510 and second RAT serving cell 520 exceeds a threshold, UE 500 may initiate a cell reselection attempt to neighboring second RAT cell 521. As part of the cell reselection attempt, UE 500 may determine the receive power of neighboring second RAT cell 521 and compare the determined receive power with a receive power threshold. If UE 500 determines that the measured receive power of neighboring second RAT cell 521 exceeds the receive power threshold, UE 500 would select neighboring second RAT cell 521 for reselection. Further basing the cell reselection attempt on a receive power of the neighboring second RAT cell ensures that the new second RAT serving cell will be able to support second RAT activities. In this sense, first RAT performance may be improved while second RAT performance is maintained.

If UE 500 determines that the measured receive power of neighboring second RAT cell 521 does not exceed the receive power threshold, UE 500 would not select neighboring second RAT cell 521 for reselection. Instead, UE 500 may initiate a cell reselection attempt to neighboring second RAT cell 522. Neighboring second RAT cell 522 may be selected by UE 500 for reselection only if the receive power of neighboring second RAT cell 522 is determined to exceed the receive power threshold.

When UE 500 selects one of the neighboring second RAT cells for reselection, and when the cell reselection attempt to the neighboring second RAT cell is successful, UE 500 may determine a percentage of conflict of the reselected second RAT cell. For example, UE 500 may monitor the use of radio 610 with the first RAT via first RAT serving cell 510, and the use of radio 610 with the second RAT via the newly reselected neighboring second RAT cell. UE 500 may also determine a percentage of conflict between the use of radio 610 by the first RAT and by the second RAT, as discussed above, by determining a percentage of time when the use of radio 610 by the first RAT conflicts with the use of radio 610 by the second RAT. The new measured percentage of conflict may be stored in memory 630.

Those skilled in the art would recognize that measuring the percentage of conflict between the use of RF resources by a first RAT and the use of RF resources by a second RAT may be performed for each newly reselected neighboring second RAT cell. Thus, for example, each time UE 500 selects a new second RAT serving cell, the percentage of conflict between the first RAT and the second RAT may be measured and stored in memory 630.

In various additional aspects of the present disclosure, UE 500 maintains a cell reselection attempt count. Each time a second RAT cell is selected for a reselection attempt, the cell reselection attempt count is increased. Additionally, a conflict percentage for each second RAT cell successfully reselected by UE 500 may be stored in memory 630. In this example, when UE 500 initiates a cell reselection attempt to a neighboring second RAT cell, the cell reselection attempt count is compared to an attempt threshold. If UE 500 determines that the cell reselection attempt count does not exceed the attempt threshold, UE 500 continues the cell reselection attempt to the neighboring second RAT cell. However, if UE 500 determines that the cell reselection attempt count exceeds the attempt threshold, UE 500 initiates a cell reselection attempt to a second RAT cell based on the percentages of conflict stored in memory 630 of FIG. 6. For example, a second RAT cell may be selected by UE 500, and that cell's percentage of conflict may be measured and stored in memory 630. It may also be determined that the measured percentage of conflict of the selected cell exceeds the predetermined threshold. In this example, UE 500 would initiate a cell reselection attempt to another RAT second cell, e.g., a neighboring second RAT cell, but the measured percentage of conflict of the previously selected second RAT cell will remain stored in memory 630. In some aspects, the measured percentage of conflict of a particular cell may remain stored in memory 630 until a new cell is reselected based on the stored percentages of conflict, and then the stored percentage of conflict of the particular cell may be flushed from memory. Alternatively, the stored percentage of conflict of the particular cell may remain in memory after a new cell is reselected based on the stored percentages of conflict, and may not be flushed until a reselection attempt to the particular cell is unsuccessful.

The same events may occur with the newly selected second RAT second cell. Thus, in this example, when the cell reselection attempt count exceeds the attempt threshold, UE 500 may use the percentages of conflict in memory 630 to determine the second RAT cell for which the measured percentage of conflict is the lowest. UE 500 may initiate a cell reselection attempt to the second RAT cell for which the measured percentage of conflict is the lowest. In some aspects, the lowest measured percentage of conflict may exceed the predetermined threshold, but limiting the number of cell reselection attempts ensures that UE 500 does not move back and forth between different second RAT cells in a short amount of time, while also increases the performance in the multi-RAT device by ensuring the lowest available conflict percentage between the first RAT and the second RAT.

An inactive timer may be initiated when the cell reselection attempt count exceeds the attempt threshold. Before expiration of the inactive timer, no cell reselection attempts based on a percentage of conflict may be initiated. As with the attempt threshold, the inactive timer ensures that UE 500 does not move back and forth between different second RAT cells in a short amount of time.

One benefit of aspects of the present disclosure is that cell reselection may be performed by the UE itself, without network intervention. For example, the UE does not need to perform separate measurements for cell reselection since serving cell and neighboring cell measurements are already carried out as part of legacy page monitoring activity. Hence legacy measurements may be used to perform efficient cell reselection by a UE.

In some aspects of the present disclosure, the conflict percentage between the shared use of RF resources by a first RAT and a second RAT may be calculated using internal software modules. For example, in one example, the conflict percentage may be calculated using a Transceiver Resource Manager (TRM). The TRM uses information on the different RATs current and upcoming activities to allocate resources between different RATs. Using such resource allocation information, the conflict percentage between the different RATs may be calculated. In another example, individual Layer 1 software modules from one RAT may interact with Layer 1 software modules from another RAT to calculate the conflict percentages.

Figure 7:
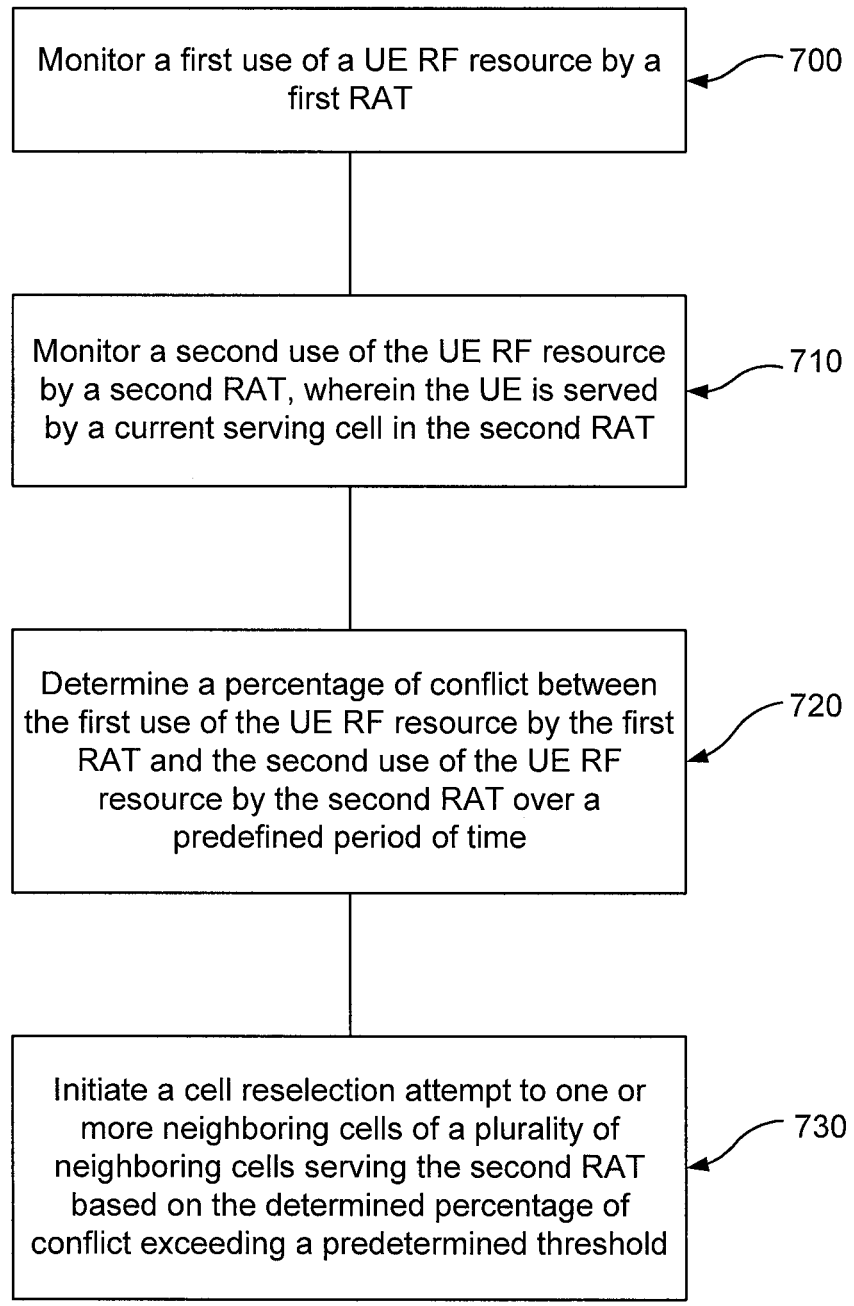
FIG. 7 is functional block diagram illustrating example blocks executed to implement one aspect of the present disclosure.

FIG. 7 is a functional block diagram illustrating example blocks executed to implement one aspect of the present disclosure. At block 700, a UE monitors a first use of a UE resource by a first RAT. At block 710, the UE monitors a second use of the UE resource by a second RAT.

At block 720, the UE determines a percentage of conflict between the first use of the UE resource by the first RAT and the second use of the UE resource by the second RAT over a predefined period of time. Determining the percentage of conflict may include measuring several conflict percentages over the predefined period of time, and calculating an average of the measured conflict percentages over the predefined period of time. Each conflict percentage may indicate a percentage of time where the first use of the UE resource by the first RAT conflicts with the second use of the UE resource by the second RAT. The conflict between the first use of the UE resource by the first RAT and the second use of the UE resource by the second RAT may occur during a tuneaway period from the first RAT to the second RAT.

At block 730, the UE initiates a cell reselection attempt to one or more neighboring cells serving the second RAT based on the determined percentage of conflict exceeding a predetermined threshold. The determined percentage of conflict may be stored in a memory for each neighboring cell to which the cell reselection attempt has occurred. The initiation of the cell reselection attempt may be further based on a receive power of the neighboring cells exceeding a receive power threshold.

It should be noted that, when one of the neighboring cells has been successfully selected as a new second RAT serving cell, the UE monitors the first use of the UE resource by the first RAT, monitors the second use of the UE resource by the second RAT, determines the percentage of conflict between the first use and the second use, initiates the cell reselection attempt with the newly selected neighboring cell as a new serving cell, and stores the percentage of conflict of the new serving cell. The UE may also maintain a cell reselection attempt count indicating a number of times the UE initiates the cell reselection attempt from the current serving cell to one of the neighboring cells. The initiation of the cell reselection attempt may include initiating, in response to the cell reselection attempt count exceeding an attempt threshold, the cell reselection attempt to a neighbor cell having a lowest percentage of conflict stored in the memory and may further include initiating an inactive timer after the cell reselection attempt count exceeds the attempt threshold. Before expiration of the inactive timer, no further cell reselection attempt based on the determined percentage of conflict is initiated.

Figure 8A:
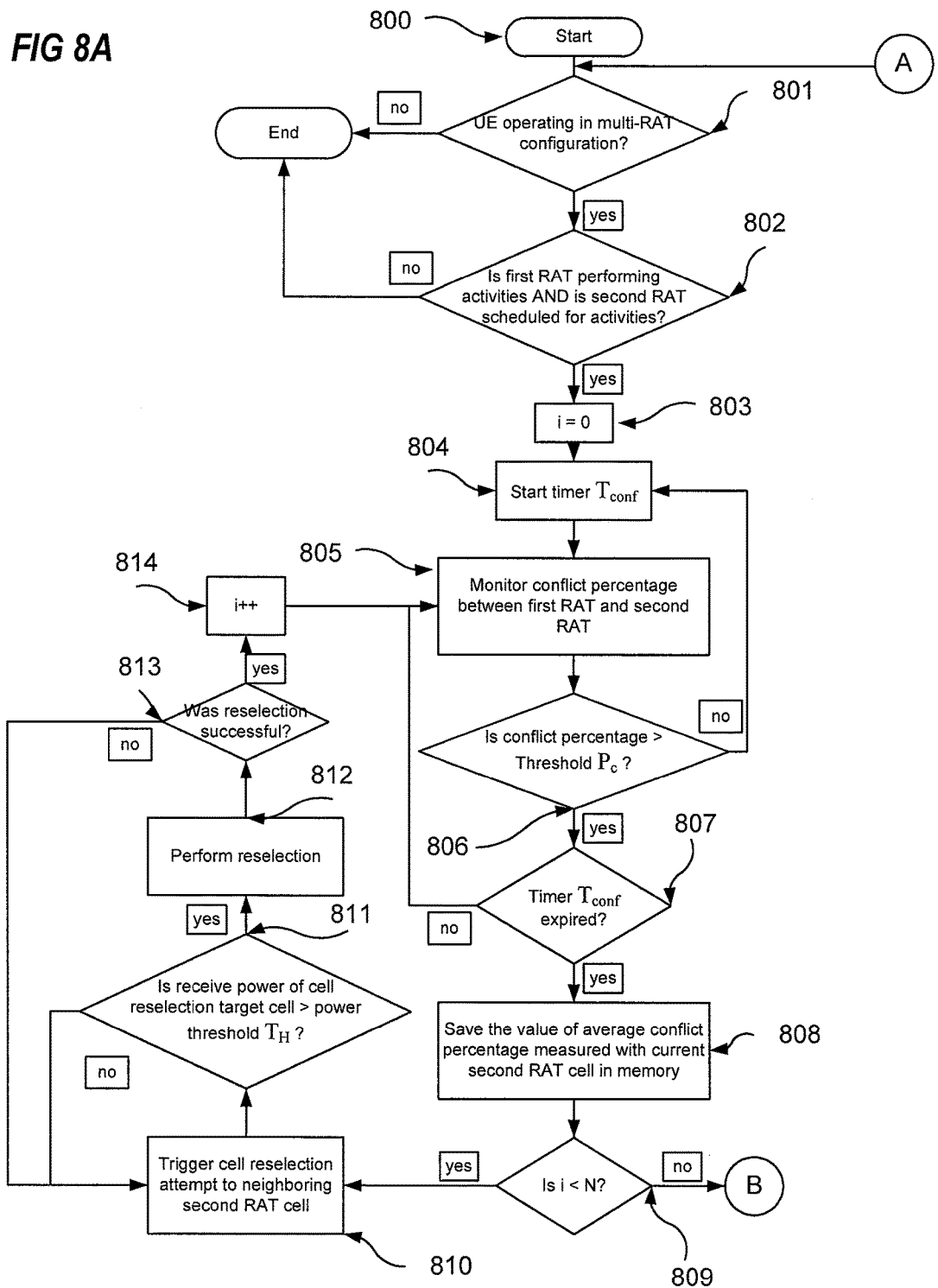
FIGS. 8A-8B are functional blocks illustrating example blocks executed to implement one aspect of the present disclosure.
Figure 8B:
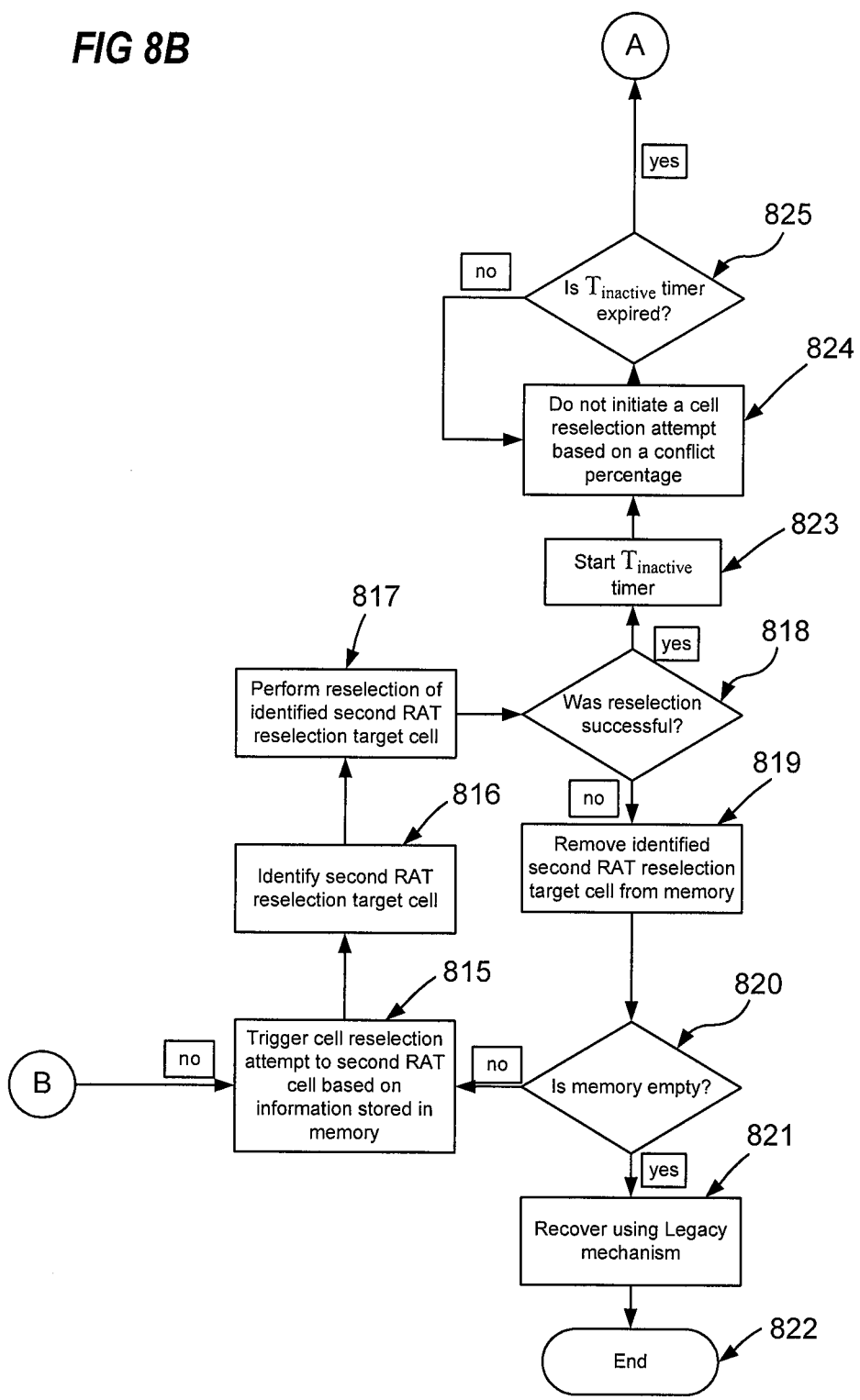

FIGS. 8A-8B are diagrams illustrating example blocks executed to implement one aspect of the present disclosure. The procedure according to this example aspect starts at block 800 of FIG. 8A. At block 801, a determination is made whether a UE is operating in a multi-RAT configuration. For example, it may be determined that the UE is operating in SVLTE+G, SGLTE+G, or SRLTE+G configuration. Specifically, at block 801, it is determined whether the UE is operating in a configuration using two different RATs, a first RAT and a second RAT. In examples of this aspect, the first RAT and second RAT may be various different types of RATs, such as GSM, LTE, TD-SCDMA, WIFI, and the like. If it is determined that the UE is not operating in a multi-RAT configuration, then there will be no conflicts between the different RATs and thus, execution is stopped.

If it is determined that the UE is operating in a multi-RAT configuration, then, at block 802, the UE determines whether the first RAT is performing activities and also determines whether the second RAT is scheduled to perform activities. If both or either are not true, then there is no likelihood of conflicts and so execution is stopped. However, if the first RAT is being used to receive LTE services and the UE is scheduled to perform second RAT activities, then there is a possibility of conflicts. For example, if the UE is using an LTE RAT for a service and the UE determines that periodic GSM page wakeups are scheduled to be performed for the GSM RAT, which would require RF radio tuneaway to the GSM RAT, then there is a possibility of conflicts. Accordingly, at block 803, a cell reselection attempt count is reset, and at block 804 a timer $T_{conf}$ is started.

At block 805, the UE monitors the conflict percentage between the use of the RF resources by the first RAT and by the second RAT. At block 806, the conflict percentage is compared with predetermined threshold $P_c$. If the conflict percentage does not exceed threshold $P_c$, then execution returns to block 804 where timer $T_{conf}$ is restarted. If the conflict percentage does exceed threshold $P_c$, then the UE determines, at block 807, whether timer $T_{conf}$ has expired. If timer $T_{conf}$ has not expired, execution returns to block 805 to continue monitoring the conflict percentage. Thus, the UE monitors the conflict percentage for at least a predetermined period of time corresponding to timer $T_{conf}$. If timer $T_{conf}$ has expired, then, at block 808, an average of the conflict percentages measured in the current second RAT cell is calculated and stored in memory.

At block 809, the UE determines whether the current cell reselection attempt count is below an attempt threshold N. If the current cell reselection attempt count is below the threshold N, then, at block 810, the UE triggers a cell reselection attempt to a neighboring second RAT cell. At block 811, the UE determines whether the receive power of the cell reselection target second RAT cell exceeds a power threshold $T_H$. If the UE determines that the receive power of the cell reselection target second RAT cell exceeds the power threshold $T_H$, then, at block 812, the UE performs reselection of the target second RAT cell. At block 813, the UE determines whether the reselection of the target second RAT cell was successful. If the UE determines, at block 813, that the reselection of the target second RAT cell was not successful, or the UE determines at block 811, that the receive power of the cell reselection target second RAT cell does not exceed the power threshold $T_H$, then execution returns to block 810 to attempt a reselection to another neighboring second RAT cell.

If, at block 813, the UE determines that reselection of the target second RAT cell is successful, then at block 814, the cell reselection attempt count is increased by one, and execution returns to block 805 to monitor the conflict percentage between the first RAT and the second RAT with the newly selected second RAT neighboring cell as the second RAT serving cell.

Continuing with FIG. 8B, if at block 809 of FIG. 8A, the UE determines that the current cell reselection attempt count has reached the attempt threshold N, then, at block 815 of FIG. 8B, the UE triggers a cell reselection attempt to a second RAT cell based on the information stored in memory at block 808 of FIG. 8A. At block 816 of FIG. 8B, the UE identifies a cell reselection target second RAT cell by determining the second RAT cell for which the average conflict percentage stored in memory is the lowest. It should be noted that it is likely, at this point, that the lowest average conflict percentage stored in memory exceeds threshold $P_c$. This is because block 815 is executed only if the cell reselection attempt count has reached the attempt threshold, which indicates that all the second RAT cells that have been selected as second RAT serving cells likely have a conflict percentage that exceeds the threshold. At block 818, the UE performs the reselection of the identified target second RAT cell, and at block 818, the UE determines whether the reselection is successful. If the reselection attempt is not successful, then, at block 819, the identified cell reselection target second RAT cell is removed from the memory. If, at block 820, the UE determines that the memory is not empty, then the UE returns execution at block 815 to identify another cell reselection target second RAT cell, otherwise, at block 821, the UE recovers using a Legacy mechanism and ends execution at block 822.

In some aspects of the disclosure, a list of successfully selected first RAT cells and second RAT cells is maintained in a different internal memory as part of a Legacy mechanism. Thus, when a cell reselection fails on all second RAT cells stored in the memory or when the memory is empty, the UE may use the Legacy mechanism to attempt reselection to a cell in the list of recently successfully selected cells stored in the different internal memory.

If, at block 818, the UE determines that the reselection is successful, then, at block 823, a $T_{inactive}$ timer is started. The $T_{inactive}$ timer is used by the UE to avoid the UE moving back and forth between different second RAT cells in a short amount of time, since it is likely that the conflict percentage of the newly reselected second RAT cell exceeds the predetermined threshold $P_c$, which, without the $T_{inactive}$ timer, would trigger a cell reselection attempt. Thus, at block 824, no cell reselection attempt based on a conflict percentage can be initiated, until it is determined, at block 825, that the $T_{inactive}$ timer has expired. When the $T_{inactive}$ timer has expired, execution returns to block 801 of FIG. 8A.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5-8 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) and any combinations thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    scheduling, by a user equipment (UE), a first use of a UE resource by a first radio access technology (RAT);
    scheduling, by the UE, a second use of the UE resource by a second RAT, wherein the UE is served by a current serving cell in the second RAT;
    monitoring, by the UE, the scheduled first use of the UE resource by the first RAT and the scheduled second use of the UE resource by the second RAT;
    calculating, by the UE, a percentage of conflict between the first use of the UE resource by the first RAT and the second use of the UE resource by the second RAT over a predefined period of time, wherein a conflict between the scheduled first use of the UE resource by the first RAT and the scheduled second use of the UE resource by the second RAT corresponds to a period of overlap between a period of time that the first use of the UE resource by the first RAT is scheduled and a period of time that the second use of the UE resource by the second RAT is scheduled, wherein the calculating the percentage of conflict includes calculating a value representing a ratio of the period of overlap to the predefined period of time, the percentage of conflict corresponding to the calculated value;
    determining that the percentage of conflict between the first use of the UE resource by the first RAT and the second use of the UE resource by the second RAT over a predefined period of time exceeds a predetermined threshold; and
    initiating, by the UE, a cell reselection attempt to one or more neighboring cells of a plurality of neighboring cells of the second RAT based on the determining that the percentage of conflict exceeds the predetermined threshold.

2. The method of claim 1, further comprising:
    storing the percentage of conflict in a memory for each of the plurality of neighboring cells to which the cell reselection attempt has occurred.

3. The method of claim 2, further comprising:
    maintaining a cell reselection attempt count indicating a number of times the UE initiates the cell reselection attempt from the current serving cell to the one or more neighboring cells;
    performing the monitoring the first use, the monitoring the second use, the calculating the percentage of conflict, the initiating the cell reselection attempt with the one or more neighboring cells as a new serving cell, and the storing the percentage of conflict of the new serving cell, wherein the initiating the cell reselection attempt includes:
        initiating, in response to the cell reselection attempt count exceeding an attempt threshold, the cell reselection attempt to a neighbor cell having a lowest percentage of conflict stored in the memory.

4. The method of claim 3, further including initiating an inactive timer after the cell reselection attempt count exceeds the attempt threshold, wherein another cell reselection attempt based on the determined percentage of conflict is not initiated before expiration of the inactive timer.

5. The method of claim 1, wherein the calculating comprises:
    measuring a plurality of conflict percentages over the predefined period of time, each conflict percentage in the plurality of conflict percentages indicating a percentage of time wherein the first use of the UE resource by the first RAT conflicts with the second use of the UE resource by the second RAT; and
    calculating an average of the measured plurality of conflict percentages over the predefined period of time.

6. The method of claim 1, wherein the conflict between the first use of the UE resource by the first RAT and the second use of the UE resource by the second RAT occurs during a tuneaway period from the first RAT to the second RAT.

7. The method of claim 1, wherein the initiating the cell reselection attempt is further based on a receive power of the one or more neighboring cells exceeding a receive power threshold.

8. An apparatus configured for wireless communication, comprising:
    means for scheduling, by a user equipment (UE), a first use of a UE resource by a first radio access technology (RAT);
    means for scheduling, by the UE, a second use of the UE resource by a second RAT, wherein the UE is served by a current serving cell in the second RAT;
    means for monitoring, by the UE, the scheduled first use of the UE resource by the first RAT and the scheduled second use of the UE resource by the second RAT;
    means for calculating, by the UE, a percentage of conflict between the first use of the UE resource by the first RAT and the second use of the UE resource by the second RAT over a predefined period of time, wherein a conflict between the scheduled first use of the UE resource by the first RAT and the scheduled second use of the UE resource by the second RAT corresponds to a period of overlap between a period of time that the first use of the UE resource by the first RAT is scheduled and a period of time that the second use of the UE resource by the second RAT is scheduled, wherein the means for calculating the percentage of conflict includes means for calculating a value representing a ratio of the period of overlap to the predefined period of time, the percentage of conflict corresponding to the calculated value;

means for determining that the percentage of conflict between the first use of the UE resource by the first RAT and the second use of the UE resource by the second RAT over a predefined period of time exceeds a predetermined threshold; and means for initiating, by the UE, a cell reselection attempt to one or more neighboring cells of a plurality of neighboring cells of the second RAT based on the determination that the percentage of conflict exceeds the predetermined threshold.

9. The apparatus of claim 8, further comprising:
means for storing the percentage of conflict in a memory for each of the plurality of neighboring cells to which the cell reselection attempt has occurred.

10. The apparatus of claim 9, further comprising:
means for maintaining a cell reselection attempt count indicating a number of times the UE initiates the cell reselection attempt from the current serving cell to the one or more neighboring cells;
means for performing the means for monitoring the first use, the means for monitoring the second use, the means for calculating the percentage of conflict, the means for initiating the cell reselection attempt with the one or more neighboring cells as a new serving cell, and the means for storing the percentage of conflict of the new serving cell, wherein the means for initiating the cell reselection attempt includes:
means for initiating, in response to the cell reselection attempt count exceeding an attempt threshold, the cell reselection attempt to a neighbor cell having a lowest percentage of conflict stored in the memory.

11. The apparatus of claim 10, further including means for initiating an inactive timer after the cell reselection attempt count exceeds the attempt threshold, wherein another cell reselection attempt based on the determined percentage of conflict is not initiated before expiration of the inactive timer.

12. The apparatus of claim 8, wherein the means for calculating comprises:
means for measuring a plurality of conflict percentages over the predefined period of time, each conflict percentage in the plurality of conflict percentages indicating a percentage of time wherein the first use of the UE resource by the first RAT conflicts with the second use of the UE resource by the second RAT; and
means for calculating an average of the measured plurality of conflict percentages over the predefined period of time.

13. The apparatus of claim 8, wherein the conflict between the first use of the UE resource by the first RAT and the second use of the UE resource by the second RAT occurs during a tuneaway period from the first RAT to the second RAT.

14. The apparatus of claim 8, wherein the means for initiating the cell reselection attempt is further based on a receive power of the one or more neighboring cells exceeding a receive power threshold.

15. A non-transitory computer-readable medium having program code recorded thereon, the program code comprising:
program code for causing a computer to schedule, by a user equipment (UE), a first use of a UE resource by a first radio access technology (RAT);
program code for causing the computer to schedule, by the UE, a second use of the UE resource by a second RAT, wherein the UE is served by a current serving cell in the second RAT;
program code for causing the computer to monitor, by the UE, the scheduled first use of the UE resource by the first RAT and the scheduled second use of the UE resource by the second RAT;
program code for causing the computer to calculate, by the UE, a percentage of conflict between the first use of the UE resource by the first RAT and the second use of the UE resource by the second RAT over a predefined period of time, wherein a conflict between the scheduled first use of the UE resource by the first RAT and the scheduled second use of the UE resource by the second RAT corresponds to a period of overlap between a period of time that the first use of the UE resource by the first RAT is scheduled and a period of time that the second use of the UE resource by the second RAT is scheduled, wherein the program code for causing the computer to calculate the percentage of conflict includes program code for causing the computer to calculate a value representing a ratio of the period of overlap to the predefined period of time, the percentage of conflict corresponding to the calculated value;
program code for causing the computer to determine that the percentage of conflict between the first use of the UE resource by the first RAT and the second use of the UE resource by the second RAT over a predefined period of time exceeds a predetermined threshold; and
program code for causing the computer to initiate, by the UE, a cell reselection attempt to one or more neighboring cells of a plurality of neighboring cells of the second RAT based on the determination that the percentage of conflict exceeds the predetermined threshold.

16. The non-transitory computer-readable medium of claim 15, further comprising:
program code for causing the computer to store the percentage of conflict in a memory for each of the plurality of neighboring cells to which the cell reselection attempt has occurred.

17. The non-transitory computer-readable medium of claim 16, further comprising:
program code for causing the computer to maintain a cell reselection attempt count indicating a number of times the UE initiates the cell reselection attempt from the current serving cell to the one or more neighboring cells;
program code for causing the computer to execute the program code for causing the computer to monitor the first use, the program code for causing the computer to monitor the second use, the program code for causing the computer to calculate the percentage of conflict, the program code for causing the computer to initiate the cell reselection attempt with the one or more neighboring cells as a new serving cell, and the program code for causing the computer to store the percentage of conflict of the new serving cell, wherein the program code for causing the computer to initiate the cell reselection attempt includes:
program code for causing the computer to initiate, in response to the cell reselection attempt count exceeding an attempt threshold, the cell reselection attempt to a neighbor cell having a lowest percentage of conflict stored in the memory.

18. The non-transitory computer-readable medium of claim 17, further including program code for causing the computer to initiate an inactive timer after the cell reselection attempt count exceeds the attempt threshold, wherein another cell reselection attempt based on the determined percentage of conflict is not initiated before expiration of the inactive timer.

19. The non-transitory computer-readable medium of claim 15, wherein the program code for causing the computer to calculate comprises:
program code for causing the computer to measure a plurality of conflict percentages over the predefined period of time, each conflict percentage in the plurality of conflict percentages indicating a percentage of time wherein the first use of the UE resource by the first RAT conflicts with the second use of the UE resource by the second RAT; and
program code for causing the computer to calculate an average of the measured plurality of conflict percentages over the predefined period of time.

20. The non-transitory computer-readable medium of claim 15, wherein conflict between the first use of the UE resource by the first RAT and the second use of the UE resource by the second RAT occurs during a tuneaway period from the first RAT to the second RAT.

21. The non-transitory computer-readable medium of claim 15, wherein the program code for causing the computer to initiate the cell reselection attempt is further based on a receive power of the one or more neighboring cells exceeding a receive power threshold.

22. An apparatus configured for wireless communication, the apparatus comprising:
at least one processor; and
a memory coupled to the at least one processor,
wherein the at least one processor is configured:
to schedule, by a user equipment (UE), a first use of a UE resource by a first radio access technology (RAT);
to schedule, by the UE, a second use of the UE resource by a second RAT, wherein the UE is served by a current serving cell in the second RAT;
to monitor, by the UE, the scheduled first use of the UE resource by the first RAT and the scheduled second use of the UE resource by the second RAT;
to calculate, by the UE, a percentage of conflict between the first use of the UE resource by the first RAT and the second use of the UE resource by the second RAT over a predefined period of time, wherein a conflict between the scheduled first use of the UE resource by the first RAT and the scheduled second use of the UE resource by the second RAT corresponds to a period of overlap between a period of time that the first use of the UE resource by the first RAT is scheduled and a period of time that the second use of the UE resource by the second RAT is scheduled, wherein the configuration of the at least one processor to calculate the percentage of conflict includes configuration of the at least one processor to calculate a value representing a ratio of the period of overlap to the predefined period of time, the percentage of conflict corresponding to the calculated value;
to determine that the percentage of conflict between the first use of the UE resource by the first RAT and the second use of the UE resource by the second RAT over a predefined period of time exceeds a predetermined threshold; and
to initiate, by the UE, a cell reselection attempt to one or more neighboring cells of a plurality of neighboring cells of the second RAT based on the determination that the percentage of conflict exceeds the predetermined threshold.

23. The apparatus of claim 22, further comprising configuration of the at least one processor to store the percentage of conflict in the memory for each of the plurality of neighboring cells to which the cell reselection attempt has occurred.

24. The apparatus of claim 23, further comprising configuration of the at least one processor:
to maintain a cell reselection attempt count indicating a number of times the UE initiates the cell reselection attempt from the current serving cell to the one or more neighboring cells;
to execute the configuration to monitor the first use, the configuration to monitor the second use, the configuration to calculate the percentage of conflict, the configuration to initiate the cell reselection attempt with the one or more neighboring cells as a new serving cell, and the configuration to store the percentage of conflict of the new serving cell, wherein the configuration of the at least one processor to initiate the cell reselection attempt includes configuration to initiate, in response to the cell reselection attempt count exceeding an attempt threshold, the cell reselection attempt to a neighbor cell having a lowest percentage of conflict stored in the memory.

25. The apparatus of claim 24, further including configuration of the at least ones processor to initiate an inactive timer after the cell reselection attempt count exceeds the attempt threshold, wherein another cell reselection attempt based on the determined percentage of conflict is not initiated before expiration of the inactive timer.

26. The apparatus of claim 22, wherein the configuration of the at least one processor to calculate comprises configuration of the at least one processor:
to measure a plurality of conflict percentages over the predefined period of time, each conflict percentage in the plurality of conflict percentages indicating a percentage of time wherein the first use of the UE resource by the first RAT conflicts with the second use of the UE resource by the second RAT; and
to calculate an average of the measured plurality of conflict percentages over the predefined period of time.

27. The apparatus of claim 22, wherein conflict between the first use of the UE resource by the first RAT and the second use of the UE resource by the second RAT occurs during a tuneaway period from the first RAT to the second RAT.

28. The apparatus of claim 22, wherein the configuration of the at least one processor to initiate the cell reselection attempt is further based on a receive power of the one or more neighboring cells exceeding a receive power threshold.

* * * * *